Dec. 31, 1946.  C. J. WHITCOMBE  2,413,669
SCREW AND NUT FASTENING
Filed Dec. 9, 1944
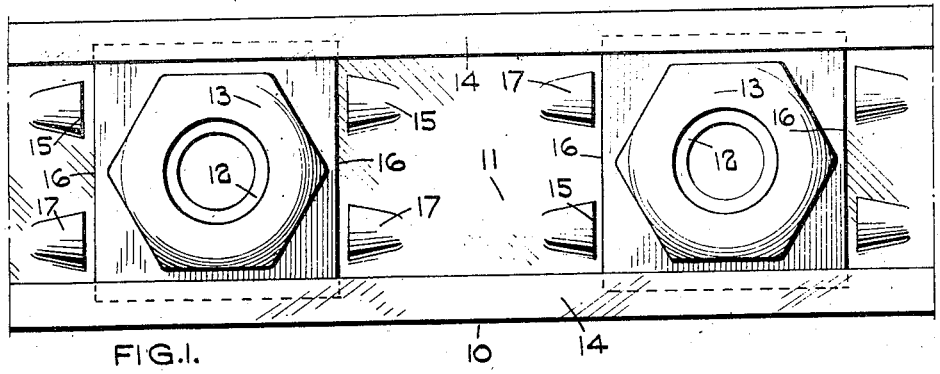
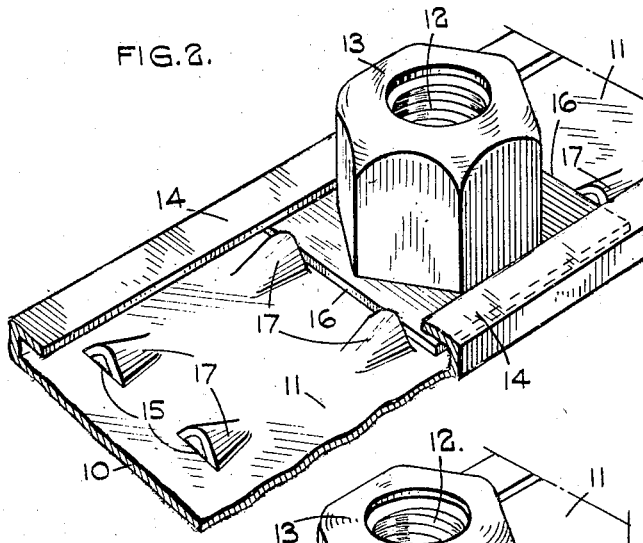
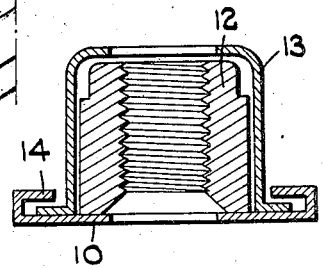
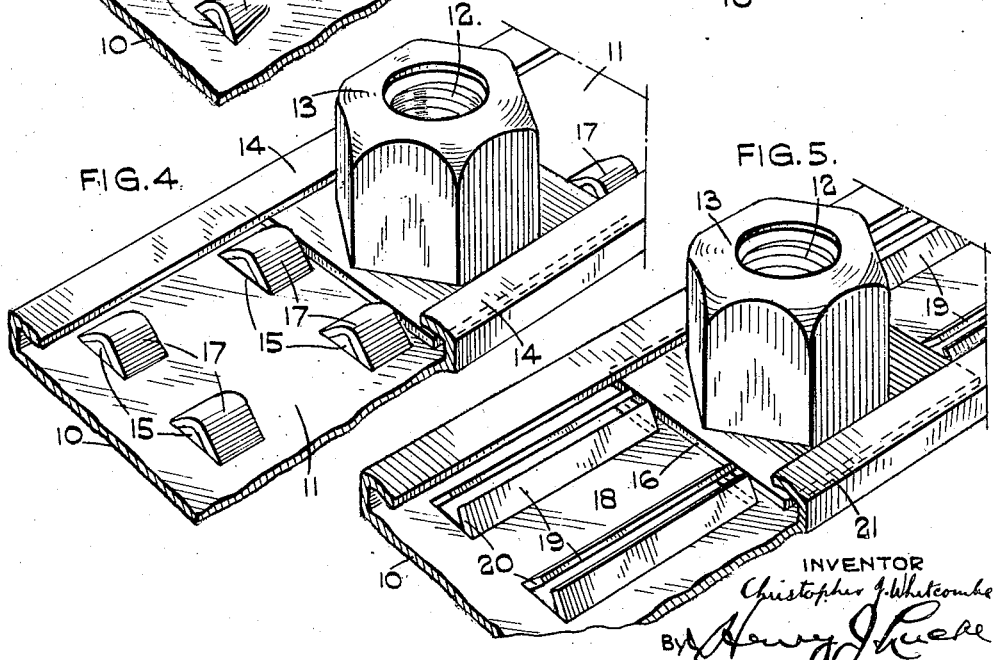
INVENTOR
Christopher J. Whitcombe.
BY
ATTORNEY.

Patented Dec. 31, 1946

2,413,669

UNITED STATES PATENT OFFICE 2,413,669

SCREW AND NUT FASTENING

Christopher John Whitcombe, Smethwick, England, assignor to Guest, Keen & Nettlefolds, Limited, Smethwick, England, a British company Application December 9, 1944, Serial No. 567,473
In Great Britain July 31, 1943

3 Claims. (Cl. 85—32)

This invention relates to screw and nut fastenings and is concerned with that kind of fastening which comprises a nut element, an attachment member in the form of a metal plate upon which the nut is mounted, said plate including a base, the nut having a limited movement in relation thereto, and means for preventing the nut from rotating about its own axis.

In such a device each nut element may consist solely of a simple nut, or may comprise a nut and a carrier within which the nut is housed, the carrier being provided for use in cases where the nut is difficult of access, or wherein access cannot be obtained thereto at all.

In the present specification the expression "nut element" is intended to embrace either a nut alone, or a nut provided with a carrier in the manner above described.

In a fastening of the above kind the attachment member is fixed to one of the elements to be secured, and is provided with a hole for each nut, which hole is larger than the bore of the nut so that the screws can be engaged therewith, and the movement permitted between the nut element and the attachment member enables the nut element to be brought into axial alignment with the screw or screws.

In such fastenings the nut element is permitted a certain limited movement both transversely in relation to the attachment member and longitudinally in relation thereto, and stops have been provided for limiting the longitudinal movement of the nut element.

In fastenings of the kind referred to, it has been proposed to form the attachment member as a strip of metal bent to channel form and having its edges turned inwardly so as to embrace flanges formed at the bottom of the elements.

In such constructions it has been proposed to form the stops to limit the longitudinal movement of the nut elements by slitting the metal at the inwardly turned edges of the attachment member, the metal being slit transversely and the metal on the side of the slit remote from the nut element being bent downwardly to form the stop.

Further, in connection with fastenings of the kind referred to, it has been proposed to form the stops by deforming the inwardly bent edges of the channel section attachment member downwardly for a suitable length in between each two nut elements, and in another arrangement it has been proposed to deform the metal at the base of the channel locally and upwardly to form the stops.

With all of these arrangements, it is found that there is a certain variation in the longitudinal movement permitted to the nut elements. The deforming of the inwardly turned edges of the channel sometimes results in those parts of the inwardly turned edges which embrace the flanges on the nut elements also being slightly deformed, in which case the longitudinal movement permitted to the nut elements is reduced.

Similarly, if the metal of the channel at the base is deformed upwardly without slitting or perforating, then the deformation may extend to some extent along the base of the channel under the nut element, with the result that the endwise movement permitted to the nut element is less than it should be.

Further if the inwardly turned edges of the channel forming the attachment plate are slit, the strength and rigidity of the channel are greatly impaired.

The primary object of the present invention is to provide an improved construction wherein the above disadvantages are avoided.

Referring to the drawing:

Figure 1 is a plan view of one form of screw and nut fastening in accordance with the present invention.

Figure 2 is a detailed perspective view of the same construction.

Figure 3 is a cross sectional view, the section being taken through the centre of one of the nut elements.

Figures 4 and 5 are views similar to Figure 2 showing two modified constructions.

In all of the constructions illustrated in the drawing the fastening comprises an attachment member 10 in the form of a metal plate of channel section, the plate including a base 11 and a plurality of spaced nuts 12 complete with carriers 13, being mounted on the attachment member, the general configuration of which as well as that of the nuts and nut carriers is similar to the construction described in my prior British Patent No. 532,831. In the construction illustrated in the drawing of the present application the edges of the channel shaped plate 10 are inturned at 14 as is the case with the construction of the prior specification.

In the constructions illustrated the nuts are shown as being mounted in carriers 13 provided with flanges which engage within the channel. The invention is however equally applicable to fastenings of the kind referred to wherein carriers are not used and the nuts are provided with flanges at the lower end which engage in the channel in the same manner as the flanges of the carriers shown in the drawing.

With the present invention instead of slitting and deforming the inwardly turned edges 14 of the channel shaped attachment member, the base thereof is formed with a number of splits and the metal adjacent the splits is displaced out of the plane of the base 11 to form stops for the carriers 13.

In the construction illustrated in Figures 1 and 2 of the drawing, the base 11 is provided adjacent each carrier 13 with four slits 15, two on one side and two on the other side of the carrier, the slits extending transversely of the attachment member and spaced slightly from but parallel to the adjacent edge 16 of the carrier, and the metal of the base 11 on the side of the carrier opposite to the slit is disposed upwardly out of the plane of the base to form stops 17 which being spaced slightly from the edge of the carrier permit of some of the nuts therewithin having a limited movement longitudinally of the attachment member.

In the construction illustrated in Figure 4 each slit 15 is replaced by a pair of slits, the slits in each pair being parallel and adjacent to each other and the metal in between the slits of each pair is disposed upwardly to form the stops.

In the further modification illustrated in Figure 5 of the drawing, the base 11 of the attachment member is provided between adjacent carriers with a pair of spaced slits 18 which extend longitudinally of the attachment member, the length of the slits being slightly less than the distance between adjacent edge portions 16 of adjacent carriers and the metal on each side of each slit is disposed upwardly out of the plane of the plate as indicated at 19 so that the ends 20 of the displaced portions form stops which permit of the carrier limbs having only a limited longitudinal or endwise movement in relation to the attachment member.

Further although I have illustrated the fastening as applied to an attachment member constructed as described in my prior Patent No. 2,249,923 and provided with nut elements as so described therein, it should be understood that its application is not limited thereto.

What I claim then is:

1. A screw fastening element comprising an attachment member in the form of a metal plate comprising a flat base and edges of channel form; a nut element having a screw receiving part disposed between the channel edges, and a flanged base opposite and parallel edges of the base flanges engaging within the channel edges but without extending to the full width thereof; and abutments on the surface of and substantially perpendicular to said base and on opposite sides of the nut element, said abutments being formed by slitting the base transversely and bending the metal adjacent one side of the slits out of the plane of the base, the abutments being so positioned in relation to the nut elements as to allow a limited sliding movement between the nut elements and the attachment plate, the base of the attachment plate having holes midway between the abutments.

2. A screw fastening element comprising an attachment member in the form of a metal plate comprising a flat base and edges of channel form; nut carriers made of sheet metal each having a non-circular part for receiving a nut, and a flanged base opposite and parallel edges of the base flanges engaging within the channel edges but without extending to the full width thereof, and abutments on the surface of and substantially perpendicular to said base and on opposite sides of the nut carriers, said abutments being formed by slitting the base transversely and bending the metal adjacent one side of the slits out of the plane of the base, the abutments being so positioned in relation to the nut carriers as to allow a limited sliding movement between the nut carriers and the attachment plate, the base of the attachment plate having holes midway between the abutments.

3. A screw fastening element comprising an attachment member in the form of a metal plate comprising a flat base and edges of channel form; a nut element having a screw receiving part disposed between the channel edges, and a flanged base opposite and parallel edges of the base flanges engaging within the channel edges but without extending to the full width thereof, and abutments on the surface of and substantially perpendicular to said base and on opposite sides of the nut element, said abutments being formed by slitting the base transversely and bending the metal adjacent one side of the slits out of the plane of the base, and to a part conical form, the abutments being so positioned in relation to the nut elements as to allow a limited sliding movement between the nut elements and the attachment plate, the base of the attachment plate having holes midway between the abutments.

CHRISTOPHER JOHN WHITCOMBE.